Patented Aug. 16, 1932

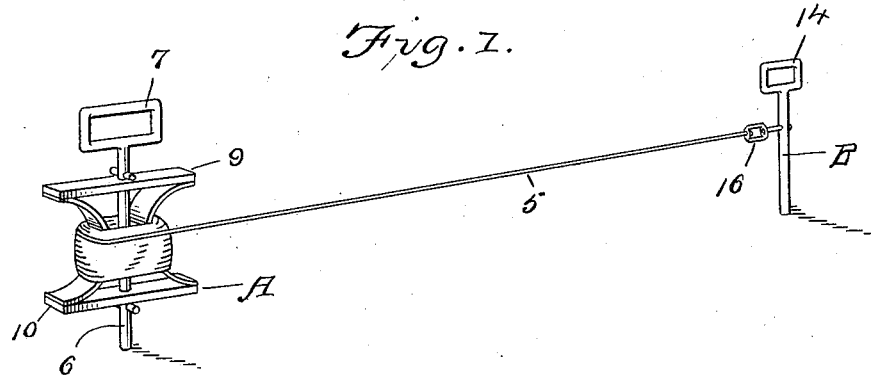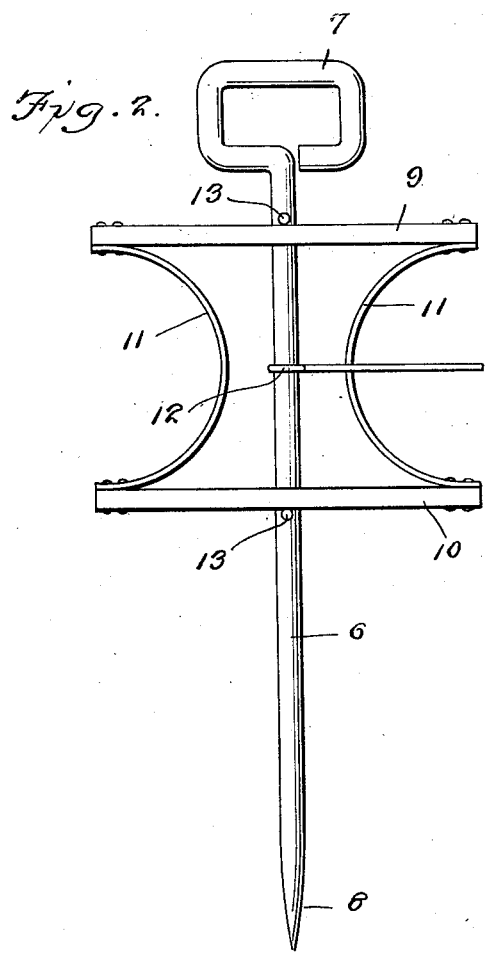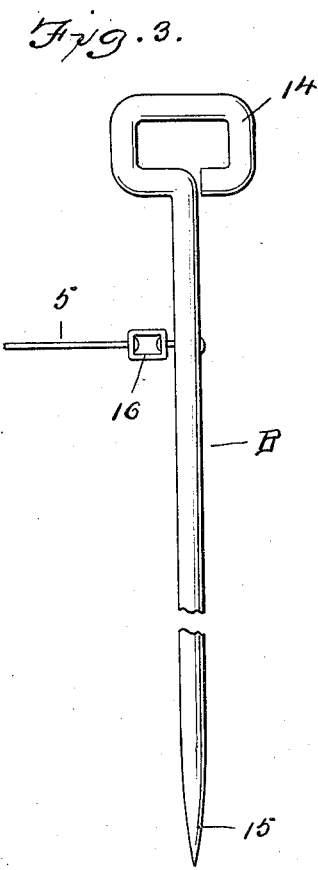

1,871,483

UNITED STATES PATENT OFFICE

CORNELIUS UITENDAAL, OF NEW CANAAN, CONNECTICUT

GARDEN REEL

Application filed June 19, 1931. Serial No. 545,525.

The invention relates to a garden implement and more especially to a garden reel.

The primary object of the invention is the provision of a reel of this character wherein ground locations can be marked off and the line therefor when wound on and unwound from the reel will feed freely without the kinking of such line, especially when wet or damp and both the reel and the terminal anchoring pin for the line can be readily and easily fixed in the ground, as the reel pin and terminal pin for the line are designed for easy penetration into the ground.

Another object of the invention is the provision of a reel of this character wherein the construction thereof is novel in form so that a line will properly wind on and unwind from the same with regularity, the reel pin for the reel and the terminal pin for the line being formed with a handle so that the same can be conveniently handled in the placing of the same for gardening purposes.

A further object of the invention is the provision of a reel of this character which is extremely simple in construction, readily portable, thoroughly reliable and efficient in its purpose, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:—

Figure 1 is a perspective view showing the reel constructed in accordance with the invention and its line extended therefrom and anchored by the terminal pin for said line.

Figure 2 is an enlarged elevation of the reel.

Figure 3 is an enlarged elevation of the terminal pin.

Similar reference characters indicate corresponding parts throughout the several views in the drawing.

Referring to the drawing in detail, A designates generally the reel and B the terminal pin for the reel line 5 which may be rope, cord or cable freely flexible and of any required length.

The reel A comprises an axle pin 6 which at its upper end is formed with a handle 7, while the opposite end presents a point 8 for penetrating the ground to anchor the said pin 6 in a vertical position.

Rotatably arranged upon the pin 6 are spaced upper and lower cross pieces 9 and 10 respectively, these being in parallelism and are united by inwardly curved or arched members 11 about which is adapted to be wound on or unwound from the line 5. The line 5 is engaged by a loop 12 with the pin 6 and the said members 11 are opposite each other and spaced from the pin at opposite sides thereof. Engaged in the pin 6 above and below the cross pieces 9 and 10 are retaining members 13, these being provided to prevent displacement of the reel longitudinally of the pin during the rotation of said reel in the winding and unwinding working thereof.

The terminal pin B is formed at its upper end with a handle 14 while the opposite end presents a point 15 for the penetration of the pin into the ground. Mounted on the pin B at the proper elevation is a swiveled coupling 16 with which is engaged the outer end of the line 5 and this coupling acts to prevent the kinking of the line when being wound upon or unwound from the reel as will be obvious.

In the use of the reel the pin 6 thereof is anchored in the ground and the terminal pin B likewise is anchored in the ground the required distance from the reel A so that the extension of the line 5 therebetween constitutes a guide for gardening purposes.

From the foregoing it is thought that the construction and manner of use of the reel will be thoroughly understood and therefore a more extended explanation has been omitted.

What is claimed is:—

The combination of a pointed pin having an upper loop handle bent therefrom, spaced cross pieces journaled in the pin, inwardly directed reversely bowed members between the pieces and having their ends joined with the ends of said pieces, and a cable embracing the pin between the pieces and adapted to be wound on and unwound
5 from the said members on rotation of the cross pieces.

In testimony whereof I affix my signature.
CORNELIUS UITENDAAL.